INVENTORS
CLIFFORD V. FRANKS
WALTER J. BROWN
BY Kenyon & Kenyon
ATTORNEYS

INVENTORS
CLIFFORD V. FRANKS
WALTER J. BROWN
BY Kenyon & Kenyon
ATTORNEYS

Feb. 7, 1956    C. V. FRANKS ET AL    2,734,160
ELECTRICAL CONTROL SYSTEMS
Filed July 31, 1951    3 Sheets-Sheet 3

INVENTORS
CLIFFORD V. FRANKS
WALTER J. BROWN
BY
Kenyon & Kenyon
ATTORNEYS

United States Patent Office 2,734,160
Patented Feb. 7, 1956

2,734,160

ELECTRICAL CONTROL SYSTEMS

Clifford V. Franks, Cleveland, Ohio, and Walter J. Brown, Titusville, Fla.; said Franks assignor to said Brown Application July 31, 1951, Serial No. 239,504

Claims priority, application Great Britain August 2, 1950

18 Claims. (Cl. 318—308)

This invention relates to electrical control systems for a controllable converter supplying power to an electrical load. Although it is generally applicable to any type of controllable converter such as one converting mechanical to electrical energy, for example a prime mover driving an electrical generator, it is particularly suitable for electrical converters for example supplying from an A. C. power line to a D. C. load such as a D. C. electric motor.

In such converter systems it is usually desirable to be able to prevent the current supplied to the load from exceeding a predetermined safe limiting value. This can usually most easily be effected by controlling the converter output in accordance with the load current so that when this current exceeds the limiting value the converter output is reduced. It is however, difficult to obtain the desired steep or rapid reduction of the output of the converter which is required as soon as the limiting current is exceeded.

The main object of the present invention is to provide an improved and simple arrangement for providing the desired steep or sharp current limiting in such converter arrangements.

In the improved control system according to the present invention the load current is limited to a permissible value by control of the converter by means of a voltage supplied to a control circuit for the converter and dependent on the voltage drop across a resistance having a high positive temperature or voltage or current coeffcient so that when energized by the load current or a current substantially directly proportional thereto, the voltage drop across the resistance rises to such a value as to effect sharp limiting of the converter output when the load exceeds a predetermined value.

Preferably the resistance comprises a tungsten wire, conveniently in an evacuated container. Thus is may consist wholly or in part of a tungsten filament lamp, preferably of a rating such that it becomes luminous when the load current increases to the limiting value so as to provide a visual indication of such condition. In some cases it may be desirable to have the resistance in two parts, one part, for example, with the main control apparatus and preferably acting as a visual indicator and the other part to act as a visual indicator on a remote control box or panel.

In a preferred arrangement a current limit signal voltage supplied to the control circuit of the converter comprises the difference between the voltage drop across the resistance and an opposed reference or controlling voltage derived from a suitable source, the value of the reference voltage being such that it is normally greater than the voltage drop across the resistance which however substantially equals or exceeds the reference voltage when the load current exceeds the limiting value. Conveniently a rectifier is included in the signal voltage circuit so as to prevent any signal voltage being supplied to the converter control circuit as long as the voltage drop across the resistance is less than a value approximately equal to the reference voltage. Usually the reference voltage will be adjustable so that the value of load current at which current limiting becomes effective can be varied to suit operating conditions. Alternatively the current limit resistance may itself be variable, for example a number of tungsten filament lamps may be used in series and/or in parallel so that the total value of the resistance can be adjusted by switching in or out one or more lamps.

The resistance may be energized in a variety of ways in accordance with the load current. Thus it may be connected directly in series with the load or in the case of an electric converter, it may be energized in accordance with the input current to the converter. For example in the case of a converter for the supply from A. C. power lines of a load such as a D. C. motor, the resistance may constitute the load on the secondary winding of a current transformer in the input circuit to the converter.

The improved arrangement according to the invention is particularly suitable for use, when current limiting is required, in the converter-load control systems described in the specifications of copending United States applications Serials Nos. 110,812, 110,813, 110,814 filed on August 17, 1949, which have subsequently issued as United States Patents 2,697,194, 2,697,197, and 2,696,583, respectively.

Several convenient arrangements according to the invention as applied to certain of the systems described in the aforementioned copending patent applications, will now be described by way of example.

In arrangements described in the aforesaid applications an electric load is supplied from a converter energized from an A. C. source, the converter comprising one or more space discharge devices (generally called thyratrons) provided with control electrodes the power supplied to the load being controlled by varying the ignition time of the converter. When, for example, the electrical load consists of the armature of an electric motor the converter ignition time is varied for speed control of the motor and to give any desired compounding characteristic by supplying to a control circuit or device for the converter a resultant voltage consisting of a controlling or reference voltage derived from a suitable source, a compounding voltage in the same sense as the reference voltage derived from a resistance in series with the motor armature and an opposing voltage representative of the motor speed derived from a shunt resistance which is connected effectively in parallel with the load and with at least a portion of a series resistance which in this particular arrangement would be the resistance from which the compounding voltage is derived.

When current limiting in accordance with the present invention is applied to such an arrangement, the resistance, such as one or more tungsten filament lamps, is connected in series with the motor armature but not within the part of the load circuit in parallel with the shunt resistance since the relatively large variations in value of the resistance as the load current varies would adversely affect the normal relationship between the controlled voltage derived from the shunt resistance and the speed of the motor. The voltage drop across the resistance is opposed to a source of reference voltage which is preferably independent of that used for the speed control and compounding circuit so that a low resistance source can be used to ensure that the current limit control when in action predominates. A suitable source is available in the case of a separately excited motor as the reference voltage can be tapped from a potentiometer in series with the motor field winding.

Normally the reference voltage exceeds the voltage across the resistance and a rectifier is so arranged in the circuit that it is non-conducting when the resultant voltage is in the same direction as the reference voltage. As the motor current increases the value of the resistance increases substantially and accordingly the voltage drop across it increases at a much more rapid rate than the current, until at the limiting value of current the curve of voltage drop against motor current is very steep. When the rectifier conducts, a signal voltage is supplied to the control circuit to reduce the output of the converter. The signal voltage may for example act to vary the value of a reactance forming part of a sensitive phase shifter controlling the ignition time of the converter, the reactance being of the thermionic tube type or a saturable reactor, examples of which are described in the specifications of the aforementioned copending patent applications. The current limiting voltage may be applied to the same electrodes of a reactance tube or the same winding of a saturable reactor as is used for controlling the converter output under normal conditions when the current is below the limiting value, or alternatively the current limiting voltage may be applied to additional electrodes or to an additional winding.

Controllable converter arrangements for supplying power to series wound commutator motors of the D. C. or universal type as well as the provision of current limiting by means of a voltage obtained from a resistance connected in series with the armature are described in the aforesaid applications. In these arrangements the output of the converter is controlled, to vary or maintain constant the motor speed, by a quantity dependent on the ratio between the voltage across the motor armature and the voltage across the motor field winding. In a convenient practical arrangement the D. C. winding of a saturable reactor forming part of the converter control device is energized by a signal voltage comprising the potential difference between a tapping point on a potential divider (in parallel with the motor armature and field) and the connection between the armature and field.

When the current limiting arrangement according to the present invention is applied to this series motor drive, the tungsten lamp or similar resistance is connected in series in the motor circuit preferably between the motor armature and the field winding. The voltage across the resistance is applied in series with the opposing reference voltage and the blocking rectifier and, if desired, in series also with the motor field winding either to a separate D. C. winding on the saturable reactor or is injected into the circuit for the reactor D. C. winding for motor speed control.

When the current limit feature comes into operation the voltage across the motor armature changes so that there is a greater difference in the ratio determining the speed controlling signal voltage than there would otherwise be. In other words, the operation of current limiting increases the normal signal voltage in a direction tending to increase the converter output and thus to reduce the effectiveness of current limiting despite the overriding control exercised by this. However, with the tungsten lamp resistance connected between the motor armature and the field winding this effect can be compensated for by connecting the reactor D. C. winding for speed control to the end of the resistance adjacent to the field winding and the current limit reactor D. C. winding to the end of the resistance adjacent to the armature. The high resistance of the tungsten lamp resistance is thus in series with the motor armature and reduces the change in the ratio determining the speed controlling signal voltage. Similar connections can be used to effect such compensation when the current limit and speed controlling signal voltages are supplied to the same D. C. winding of the reactor.

When the resistance forms the load of a current transformer in the input circuit to the converter it will usually be preferable for the current transformer arrangement to be such that the secondary winding or windings to which the resistance is connected will have as symmetrical an output as possible. For example, in the case of a single phase full wave converter, the current transformer preferably has two opposed primary windings respectively in series in the conductors to the two converter anodes and a single secondary winding. The voltage derived from the resistance is preferably rectified and the rectified voltage balanced against a D. C. reference voltage.

For a better understanding of the invention as well as other objects and further features thereof, reference is had to the following detailed description to be read in connection with the accompanying drawings wherein like components in the several figures are identified by like reference numerals.

Figure 3:
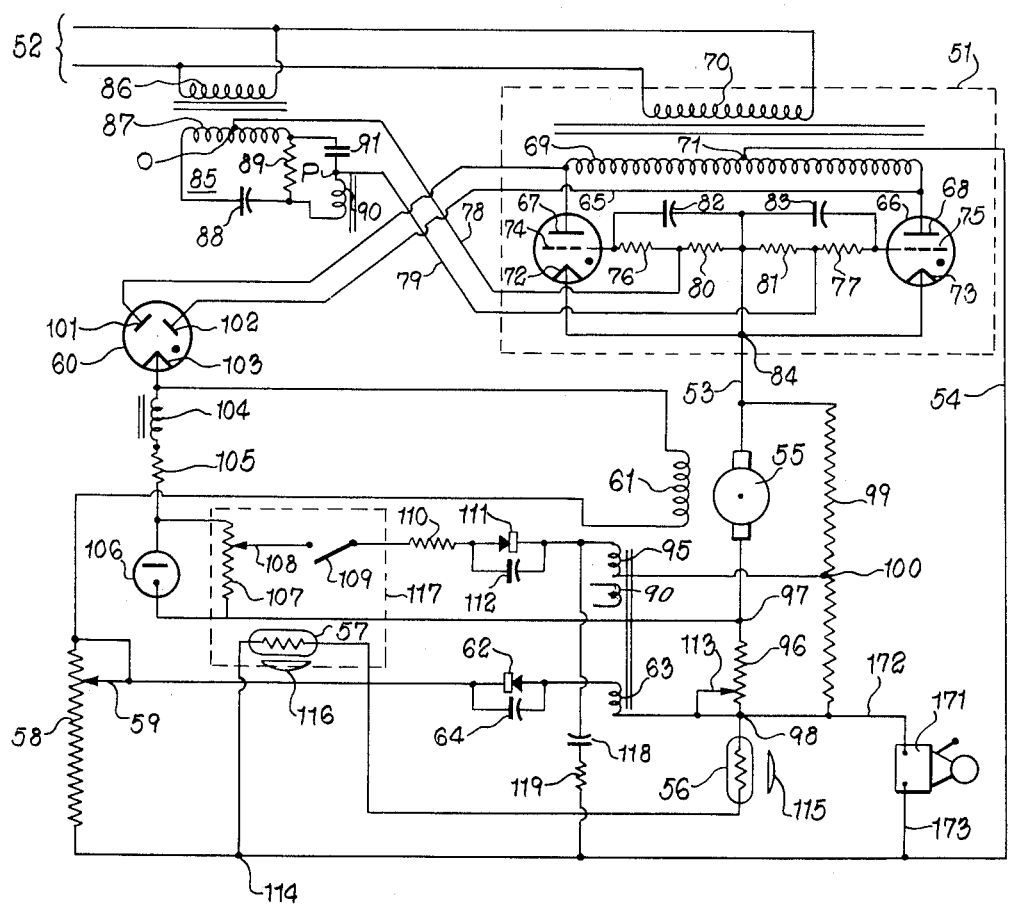
Figure 3 is the complete schematic circuit diagram of the apparatus illustrated in Figure 1.
Figure 4:
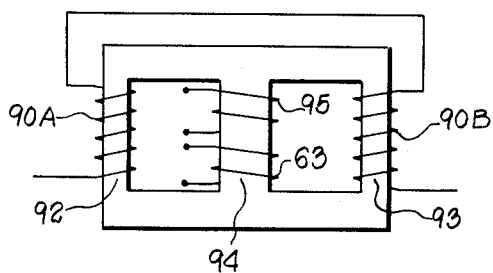

Figure 4 separately illustrates the structure of the saturable reactor shown schematically in Figure 3.

Figure 5:
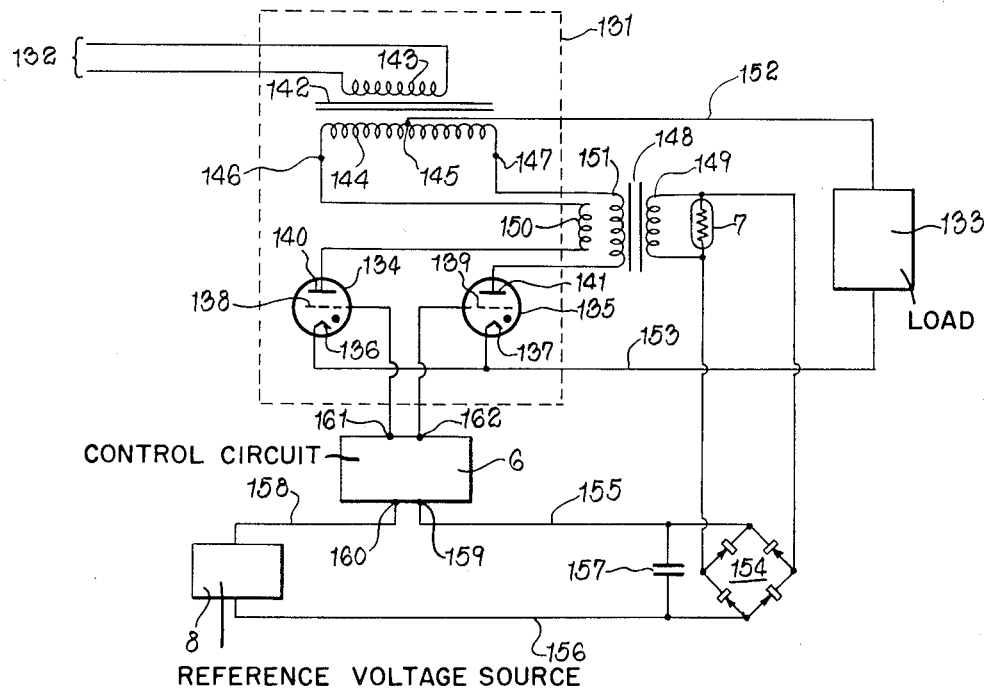

Figure 5 is a schematic circuit diagram of yet another preferred embodiment of the invention.

Figure 1:
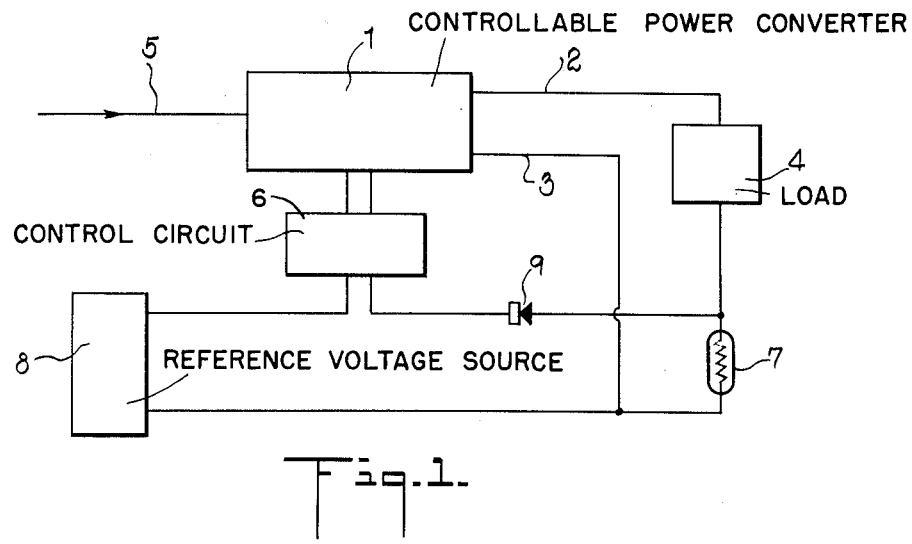
Figure 1 is a block diagram illustrating one preferred embodiment of the invention.

Fig. 1 shows one form of the invention, schematically. 1 is a controllable power converter having an electrical output through conductors 2, 3, to a load 4. It has an input 5 which may be electrical, or might be some other form such as mechanical, thermal, nuclear, etc. 6 is a control circuit for controlling the power in the converter. 7 is a resistor having a high positive temperature or voltage or current coefficient of resistance (the ohmic value of the resistance increases rapidly as the temperature or the voltage or the current applied to the resistor is increased). 8 is a source of reference voltage, preferably adjustable.

The voltage drop in resistor 7 is applied in opposition to the reference voltage from source 8 to the control circuit 6 which therefore controls the power in the converter in accordance with the difference between the said reference voltage and the said voltage drop, the arrangement being such that when said voltage drop increases, the converter power is reduced. If the control circuit is a sensitive one, such an arrangement will continuously control or regulate the converter power so as to maintain substantially constant current in the output circuit of the converter.

A rectifier 9 is preferably connected in series with the circuit including the opposing voltages, and is so polarized that a voltage is only applied to the control circuit when the voltage drop in resistor 7 exceeds a value which is approximately equal to the reference voltage 8, and the control circuit is arranged to decrease the converter power as the voltage applied to the control circuit increases.

Such an arrangement provides a sharp current-limiting characteristic in the converter output circuit. When the output current reaches a predetermined value, the voltage drop in resistor 7 becomes approximately equal to the reference voltage 8, the rectifier 9 conducts, and the difference-voltage applied to the control circuit 6 reduces the converter power. Since the resistor 7 has a high positive temperature or voltage or current coefficient, the voltage drop across it increases more rapidly than the current flowing through it, and the difference voltage increases still more rapidly, so that the converter power is sharply limited, i. e., if for any reason the current through 4 tends to increase above a predetermined value the resistor 7 will tend to react on control circuit 6 to reduce the converter power, and this reaction will be the faster because of the high positive resistance coefficient of resistor 7.

Figure 2:
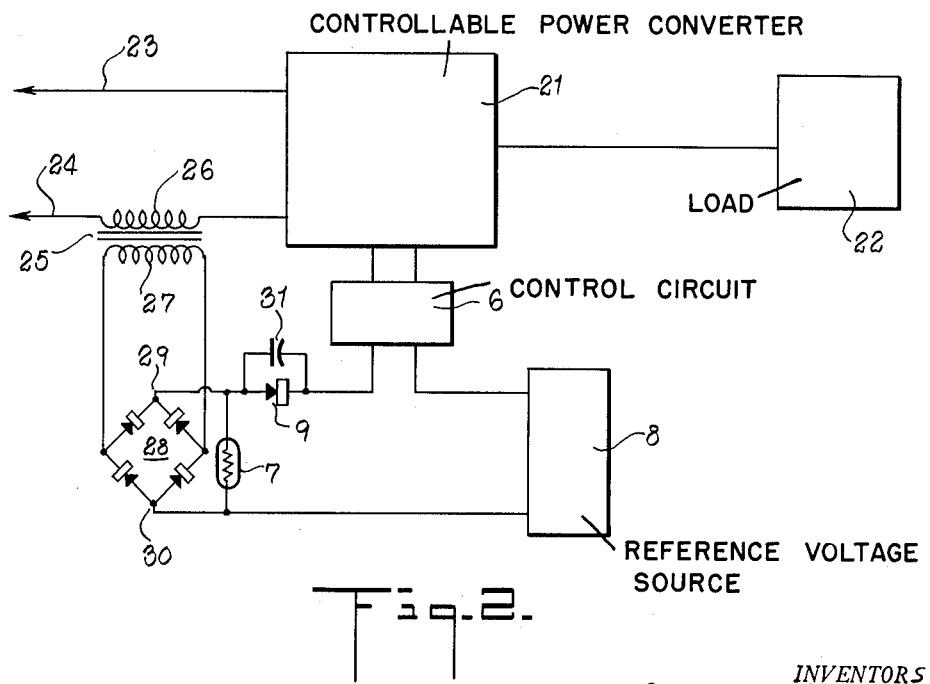
Figure 2 is a diagram partially in block form and partially in schematic circuit form illustrating another preferred embodiment of the invention.

Fig. 2 shows schematically another arrangement of the invention which is adapted to regulate or limit the input current to a controllable power converter 21 which delivers power to a load 22, which may be an electrical or a mechanical load. The converter 21 is shown as having an A. C. input through conductors 23 and 24, and the power in the converter is controlled by control circuit 6. A current transformer 25 has its primary winding 26 in series with input conductor 24. A bridge-type rectifier 28 is preferably connected across the secondary winding 27 of current transformer 25 so as to develop a unidirectional voltage across its output terminals 29 and 30. The resistor 7, which has a high positive temperature or voltage or current coefficient is connected across the terminals 29 and 30, and said resistor acts as the effective load of the current-transformer 25. Since the transformer 25 delivers a current from its secondary winding 27 through rectifier 28 to the resistor 7, which is proportional to the input current to the converter 21, and since the ohmic value of resistor 7 increases with the current flowing through it, the voltage drop across resistor 7 will increase more rapidly than said input current increases.

Source 8 is a source of unidirectional reference voltage preferably adjustable and is connected in series with resistor 7 with such polarity that the unidirectional voltages in source 8 and resistor 7 oppose each other and the difference voltage is applied, preferably through rectifier 9 to the control circuit 6 which controls the converter power. If the rectifier 9 is omitted the arrangement operates as a current regulating circuit to maintain substantially constant input current to the converter. If the rectifier 9 is included, the arrangement operates as a current limiting circuit to reduce the converter power sharply when its input current reaches such a value that the voltage drop across resistor 7 exceeds a value approximately equal to the reference voltage 8. A condenser 31 is preferably connected across rectifier 9 to reduce the ripple across said rectifier and thereby to sharpen its transition from the non-conducting to the conducting state as the voltage across resistor 7 increases.

Fig. 3 shows a complete circuit of the type shown schematically in Fig. 1. Rectangle 51 is a controllable power converter having an input from A. C. power line 52 and a unidirectional electrical output to conductors 53 and 54 which supply power to a load comprising a D. C. motor armature 55. Resistors 56 and 57 are connected in series with the converter output and the load; said resistors have a high positive temperature or voltage or current coefficient and they preferably comprise tungsten filament lamps of suitable current rating. The adjustable resistor 58 which preferably has an adjustable tapping 59 is supplied with unidirectional current from rectifier 60 through the motor field winding 61 and constitutes a source of adjustable unidirectional reference voltage. Said reference voltage source is connected in series opposition with the voltage drop across resistors 56 and 57, through rectifier 62 and through the D. C. control winding 63 of a saturable reactor which forms part of a control circuit to be described; a condenser 64 is connected across the rectifier 62 to reduce ripple voltages.

The converter 51 comprises a pair of space discharge devices such as gas or vapor-filled tubes (commonly called thyratrons) 65, 66, having anodes 67, 68 connected to the ends of secondary winding 69 of a transformer which also has a primary winding 70 connected to the A. C. power line 52. The secondary winding has a center tap 71 which constitutes the negative output terminal of converter 51. The tubes 65 and 66 also have cathodes 72, 73 which are heated by another transformer winding (not shown), and which are connected to terminal 84 which forms the positive output terminal of converter 51, and to conductor 53. The tubes 65, 66 also have grids 74, 75, for controlling the load in the converter 51 and said grids are connected through the transient-filtering resistors 76, 77, to conductors 78, 79 which are in turn connected to the output terminals O and P of a phase-shifting network 85 of the type described in U. S. Letters Patent 2,524,762.

Resistors 80 and 81 are connected respectively between conductors 78, 79 and the cathode terminal 84 so that the output voltage from the phase-shifter terminals O and P is divided and applied in phase opposition to the grids 74 and 75. Transient-filtering condensers 82, 83 are connected from the grids 74, 75 to the cathode terminal 84. The phase-shifting network 85 is supplied from a transformer having its primary 86 connected to the A. C. power line 52, and having a secondary 87 which is center-tapped at point O. A condenser 88 and resistor 89 are connected across the whole secondary winding so as to establish an A. C. baseline voltage across resistor 89 as described in U. S. Letters Patent 2,524,762 (especially with reference to Figs. 5 and 2). The variable inductance 90 and fixed condenser 91 are connected in series across resistor 89 with the output terminal P in the series connected between them and the arrangement is such that when the inductance is decreased, the phase angle of the voltage between O and P is advanced and this accordingly advances the ignition angle of the grids of tubes 65 and 66 and increases the output of the converter 51.

Referring now to Fig. 4, the inductance 90 comprises the series-connected A. C. windings 90A and 90B of a saturable reactor, which are wound on the outer legs 92, 93 of a core having three legs. Two D. C. control windings 63 and 95 are wound on the center leg 94. The arrangement is such that when a D. C. voltage is applied to the winding 95, the outer core legs are partially saturated, the inductance of windings 90A and 90B is reduced, the phase angle of voltage OP is advanced, and the power in converter 51 is increased. If a second D. C. voltage is then applied to the D. C. winding 63 so as to magnetize the leg 94 in an opposite sense to the winding 95, the degree of saturation will be reduced, the phase angle of voltage OP retarded, and the power in converter 51 will be reduced.

Reverting to Fig. 3, the D. C. control winding 95 is used for controlling the motor speed under normal conditions as will be described, while the D. C. control winding 63 is used for limiting the current output from converter 51 to a predetermined maximum value.

The normal speed-controlling circuits for the motor will now be described. A resistor 96 is connected in series with the motor armature, between its negative terminal 97 and the positive terminal 98 of the current-limiting resistor 56. A resistor 99, having a tapping point 100, is connected between the positive conductor 53 and the terminal 98. A source of speed-controlling reference voltage is obtained from the rectifier 60 which has its anodes 101, 102 connected to ends of transformer secondary 69. The cathode 103 is connected through filter choke 104, resistor 105, and voltage-regulating glow discharge tube 106 to terminal 97 and thence through resistors 96, 56 and 57 to the center tap 71 of transformer secondary 69. In this way a controlled voltage can be maintained across the tube 106 regardless of any voltage drops in resistors 96, 56 and 57, and regardless of power line fluctuations. The speed-controlling reference voltage is obtained from a potentiometer 107 connected across the tube 106 and having an adjustable tapping 108 for adjusting the reference voltage which appears between said tapping and the terminal 97. The tapping 108 is connected through a switch 109, a resistor 110, a rectifier 111 and the control winding 95 to the tapping 100 on resistor 99; a condenser 112 is connected across rectifier 111.

When switch 109 is open, no voltage is applied to the control winding 95 and the motor will not run. When switch 110 is closed, a unidirectional voltage is applied to the circuit 110, 111, 95, which is equal to the sum of the reference voltage (between terminals 108 and 97) and the voltage drop in the resistor 96 (which is in series with the load), minus the voltage which is developed between terminals 100 and 98 (which is a proportion of the voltage across resistor 99 which is in parallel with the load and the series resistor 96). Providing the resistor 96 is adjusted to the appropriate value, this arrangement will control the output power from the converter in such a way that the motor will run at a constant speed which is dependent upon the adjustment of the speed-controlling tapping 108 but which is substantially independent of the mechanical load applied to the motor. Resistor 96 preferably has a tapping 113 for adjusting it to the correct value. As the mechanical load on the motor is increased, the voltage drop in series resistor 96 increases, and said voltage drop is added to the reference voltage between 108 and 97, thus increasing the voltage which is applied (through resistor 110 and rectifier 111) to control winding 95, thus increasing the converter output until the opposing voltage between terminals 100 and 98 has correspondingly increased, which results in a condition of increased armature voltage (between terminals 84 and 98), thus maintaining a constant speed in spite of the increased IR drop in the armature. (The purpose of rectifier 111 is to prevent the system from accidentally getting out of control if the speed-controlling reference voltage is suddenly reduced as described in U. S. patent applications Ser. Nos. 110,812 and 110,813 filed by W. J. Brown which have subsequently issued as United States Patents 2,697,194 and 2,697,197, respectively.)

The current-limiting control winding 63 and its associated circuits are provided for the purpose of steeply limiting any further increase in output current from the converter after a predetermined maximum value of such current is reached as a result of overloading the motor or of accelerating it rapidly to a higher speed, and the operation of the current-limiting arrangement will now be described in detail.

A voltage drop occurs across the resistors 56 and 57, between terminals 98 and 114, the potential at terminal 98 being relatively positive to that at terminal 114. There is also a fixed predetermined reference voltage between tapping 59 and terminal 114, the potential at 59 being positive in relation to that at 114. When the converter output current is less than a predetermined value, said voltage drop is less than said reference voltage and the potential at terminal 98 is less positive than the potential at tapping 59; the rectifier 62 is polarized so as not to conduct under these conditions and no current flows in control winding 63. However, when the converter output exceeds a predetermined value, the voltage drop across resistors 56 and 57 increases rapidly (since both the current and the ohmic resistance are increasing) and the potential of terminal 98 becomes sufficiently positive to start a current flowing from terminal 98 through the control winding 63 and the rectifier 62 to the tapping 59; this current is in a direction to oppose the magnetization produced in limb 94 (see Fig. 4) by the speed-controlling winding 95 and accordingly it tends to reduce the saturation of the core limbs 92 and 93, thus tending to increase the inductance 90 and to retard the phase angle of the voltage between O and P and to reduce the converter output and steeply limit any further rise of output current. The limiting effect is a steep one because of the rapid rise in voltage drop in resistors 56 and 57. The current-limiting effect is further steepened because the resistance of the current-limiting circuit 59, 58, 114, 57, 56, 98, 63, 62 is made as low as possible, for instance by making resistor 58 carry the whole of the motor field current, while on the other hand the resistance of the speed-controlling circuit 108, 107, 97, 96, 98, 100, 95, 111, 110 is made relatively high by inclusion of the resistor 110 and/or by making the resistances 107, 99, relatively high in value. In this way the current-limiting circuit will dominate the control of the speed-controlling circuit in spite of the resulting tendency for the voltage between tappings 108 and 100 to increase as the converter output is reduced by the current-limiting effect.

Conveniently the resistors 56 and 57 may comprise tungsten-filament lamps which are arranged to glow when the predetermined maximum current flows, and thus to give a warning of overload. Said lamps may be mounted behind red glass screens 115 and 116 to emphasize said warning. Furthermore, one lamp 56 may be mounted in the main converter structure while the second lamp 57 may be mounted in a remote speed-controlling box shown schematically by the dotted rectangle 117 so as to give visible warning of overload at both positions. If such duplicate visible warning is not required, the second lamp or resistor 57 may be omitted and a single resistor 56 may be used.

A high capacity condenser 118 and a resistor 119 are preferably connected as shown to stabilize the operation of the speed-controlling circuits.

Fig. 5 is a schematic diagram of another arrangement of the invention, which is adapted to regulate or limit the anode currents in a controllable converter employing space discharge devices. The converter 131 derives its power from A. C. power line 132 and delivers a controllable D. C. output to the load 133. The converter 131 includes a pair of gas discharge tubes 134, 135, having cathodes 136, 137 which are heated by means not shown, and also having control grids 138, 139 and anodes 140, 141. The anodes are energized from a transformer 142, having a primary winding 143 connected to A. C. power line 132, and a secondary winding 144 having a center tap 145 and end terminals 146, 147. The center tap 145 forms the negative output terminal of the converter and is connected to the load 133 through conductor 152. The cathodes 136 and 137 are connected to a conductor 153 which forms the positive output terminal and is also connected to the load. A current transformer 148 is provided, having a secondary winding 149 and two primary windings 150, 151. Primary winding 150 is connected between transformer terminal 146 and anode 140; primary winding 151 is connected, in the opposite sense, between transformer terminal 147 and anode 141; accordingly the current transformer 148 is energized by the currents to both anodes, but in opposing sense, so that a symmetrical alternating current output is delivered from the secondary winding 149. A resistor 7 having a high positive temperature or voltage or current coefficient is connected directly across the secondary winding 149, and a bridge type rectifier 154 is connected across the resistor, and the output terminals of the rectifier are connected to conductors 155 and 156, between which a condenser 157 is preferably connected. A source of unidirectional reference voltage 8, which is preferably adjustable, is connected between conductors 156 and 158, and is polarized so that only the difference between the reference voltage and the output voltage of rectifier 154 is applied to the conductors 155, 158. Said conductors 155 and 158 are connected to the signal terminals 159, 160 of a control circuit 6, the output terminals 161, 162 of which are connected to grids 138, 139, and which is arranged to control the power in the converter in accordance with the current or voltage applied between the signal terminals 159, 160.

When the currents to anodes 140, 141 are small, the current delivered to resistor 7 from the current transformer 148 is small, and the voltage drop across resistor 7 is small; accordingly the rectifier 154 only delivers a small unidirectional voltage output to condenser 157, which is less than the voltage to which the condenser 157 is already charged by the reference source 8; accordingly no current flows between the signal terminals 159, 160 of the control circuit.

As the currents to anodes 140, 141 are increased the current flowing into resistor 7 increases proportionately, and the ohmic value of the resistance also increases, so that the voltage drop across resistance 7 increases rapidly.

When a predetermined value of the anode currents is reached, the voltage drop across resistor 7 will become high enough to charge the condenser 157, through the rectifier 154, to a higher voltage than the voltage of the reference source 8. Current will then flow from signal terminal 159 to signal terminal 160 and the control circuit 6 will operate to reduce the power in the converter and restrain any further rise in anode current.

Fig. 3 also shows an additional feature of the invention by which it is possible to provide an audible alarm, as well as a visual alarm, of an overloaded condition of the converter. In Fig. 3 an electric bell or other electrically-operated audible alarm device 171 is connected through conductors 172 and 173 in parallel with the resistors 56 and 57. The alarm device 171 is so designed as to be inoperative under normal load conditions, but to become operative when the voltage drop across resistors 56 and 57 becomes sufficient to produce a current-limiting effect in accordance with the principles previously described. Since the ohmic value of resistors 56 and 57 increases with the current through it, the voltage drop across resistors 56 and 57 rises steeply and it is readily possible to design the alarm device 171 so as to operate only when the steep voltage rise has become sufficient to produce a current-limiting effect. The alarm device 171 may be designed to operate from direct current, or from alternating curernt, or from a combination of the two, according to the nature of the current flowing in resistors 56 and 57. An alarm of this character may also be used in the arrangements of Figures 1, 2 and 5 across the corresponding resistors.

We claim:

1. In an electrical system having a controllable converter supplying power to a load, a current-limiting control circuit for the converter including an impedance which increases as the current through it increases connected to carry a current dependent on the load, a reference voltage source, means for deriving a control voltage representing the difference between the voltage across said impedance and the voltage of said reference voltage source and applying the control voltage to the converter to regulate the output thereof, said impedance having a high positive coefficient of resistance.

2. A system as in claim 1 including an audible signal device arranged to be actuated by an increase of the voltage across said impedance to a predetermined extent.

3. A system as in claim 1 in which said impedance is an incandescent lamp and said circuit is so arranged that said incandescent lamp becomes luminous at currents through said impedance in excess of a predetermined normal operating current for said system.

4. In an electrical system having a controllable conveter supplying electrical power to a load, a current-limiting control circuit for the converter including an impedance which increases as the current through it increases connected to carry a current which is a measure of the current of the load, a reference voltage source, means for deriving a control voltage representing the difference between the the voltage across said impedance and the voltage of said reference voltage source and applying the control voltage to the converter to limit the output thereof when that output tends to exceed a predetermined value, said impedance having a high positive coefficient of resistance.

5. A system as in claim 4 including an audible signal device arranged to be actuated by an increase of the voltage across said impedance to a predetermined extent.

6. A system as in claim 4 in which said impedance is an incandescent lamp and said circuit is so arranged that said incandescent lamp becomes luminous at currents therethrough in excess of those corresponding to said predetermined value of converter output.

7. In an electrical system having a controllable converter supplying electrical power to a load, a current-limiting control circuit for the converter including an impedance which increases as the load current increases connected in series with the load, a reference voltage source, means for deriving a control voltage representing the difference between the voltage across said impedance and the voltage of said reference voltage source and applying the control voltage to the converter to reduce the output thereof when that output tends to exceed a predetermined value, said impedance having a high positive coefficient of resistance.

8. A system as in claim 7 in which said impedance is an incandescent lamp and said circuit is so arranged that said incandescent lamp becomes luminous at currents therethrough in excess of those corresponding to said predetermined value of converter output.

9. In an electrical system having a controllable converter supplying unidirectional electrical power to a load, a current-limiting control circuit for the converter including an impedance which increases as the load current increases connected in series with the load, a unidirectional reference voltage source, a rectifier for deriving a control voltage representing the excess, if any, of the unidirectional voltage across said impedance over the voltage of said reference voltage source and applying the control voltage to the converter to reduce the output thereof when that output tends to exceed a predetermined value, said impedance having a high positive coefficient of resistance.

10. A system as in claim 9 in which said impedance is an incandescent lamp and said circuit is so arranged that said incandescent lamp becomes luminous at currents therethrough in excess of those corresponding to said predetermined value of converter output.

11. In an electrical system having a controllable converter supplying electrical power to a load, a current-limiting control circuit for the converter including a current transformer having its primary winding in the circuit of said converter, an impedance which increases as the current through it increases connected across the secondary of said transformer to carry a current dependent on the load, a rectifier having its input circuit connected across said impedance, a unidirectional reference voltage source, means for deriving a control voltage representing the difference between the voltage output of said rectifier and the voltage of said reference voltage source and applying the control voltage to the converter to regulate the output thereof, said impedance having a high positive coefficient of resistance.

12. A system as in claim 11 in which said impedance is an incandescent lamp and said circuit is so arranged that said incandescent lamp becomes luminous at currents through said impedance in excess of a predetermined normal operating current for said system.

13. In an electrical system having a controllable converter supplying electrical power to a load, a current-limiting control circuit for the converter including a current transformer having its primary winding in the circuit of said converter, a rectifier having its input connected across the secondary winding of said transformer, an impedance which increases as the current through it increases connected across the output of said rectifier to carry a current dependent on the load, a unidirectional reference voltage source, means for deriving a control voltage representing the difference between the voltage across said impedance and the voltage of said reference voltage source and applying the control voltage to the converter to regulate the output thereof, said impedance having a high positive coefficient of resistance.

14. A system as in claim 13 in which said impedance is an incandescent lamp and said circuit is so arranged that said incandescent lamp becomes luminous at currents therethrough in excess of those corresponding to a predetermined value of converter output.

15. A system as in claim 13 in which said last mentioned means includes a second rectifier in circuit between said impedance and reference voltage source.

16. In an electrical system having a motor with armature and field winding circuits and a controllable converter supplying electrical power to the armature winding, the converter having a negative terminal common to the armature and field winding circuits, a current control circuit for the converter including a first impedance which increases as the load current increases in the armature winding circuit between the armature winding and said negative terminal, a reference voltage source comprising a second impedance in the field winding circuit between the field winding and said negative terminal, means for deriving a control voltage representing the difference between the voltage across said first impedance and the voltage across said second impedance and applying the control voltage to the converter to regulate the output thereof, said first impedance having a high positive coefficient of resistance.

17. A system as in claim 16 in which said first impedance is an incandescent lamp and said circuit is so arranged that said incandescent lamp becomes luminous at currents therethrough in excess of those corresponding to a predetermined value of converter output.

18. A system as in claim 16 in which the last-mentioned means includes a rectifier so arranged that the control voltage arises only when the voltage across the first impedance exceeds that across the second impedance.

References Cited in the file of this patent

UNITED STATES PATENTS

| | | |
|---|---|---|
| 1,364,129 | Meyer | Jan. 4, 1921 |
| 1,703,146 | Holden | Feb. 26, 1929 |
| 2,013,878 | Cotter et al. | Sept. 10, 1935 |
| 2,086,910 | Hansell | July 13, 1937 |
| 2,380,784 | Patin | July 31, 1945 |
| 2,413,033 | Potter | Dec. 24, 1946 |
| 2,517,101 | Few | Aug. 1, 1950 |
| 2,554,695 | Brown | May 29, 1951 |